G. LEISCHNER.
TIRE TIGHTENER.
APPLICATION FILED NOV. 28, 1914.
1,162,293.
Patented Nov. 30, 1915.
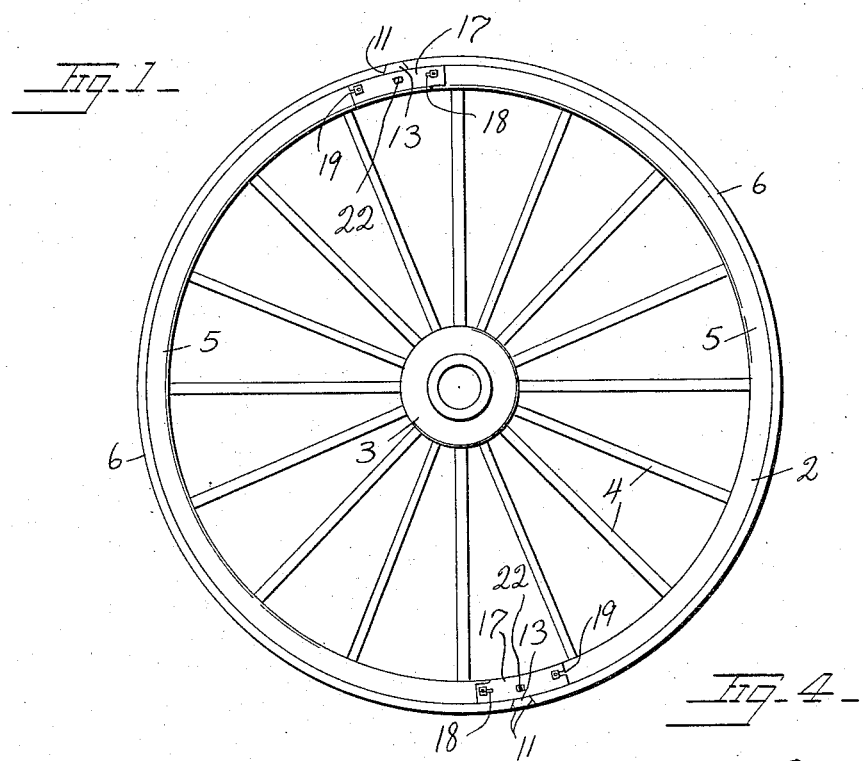
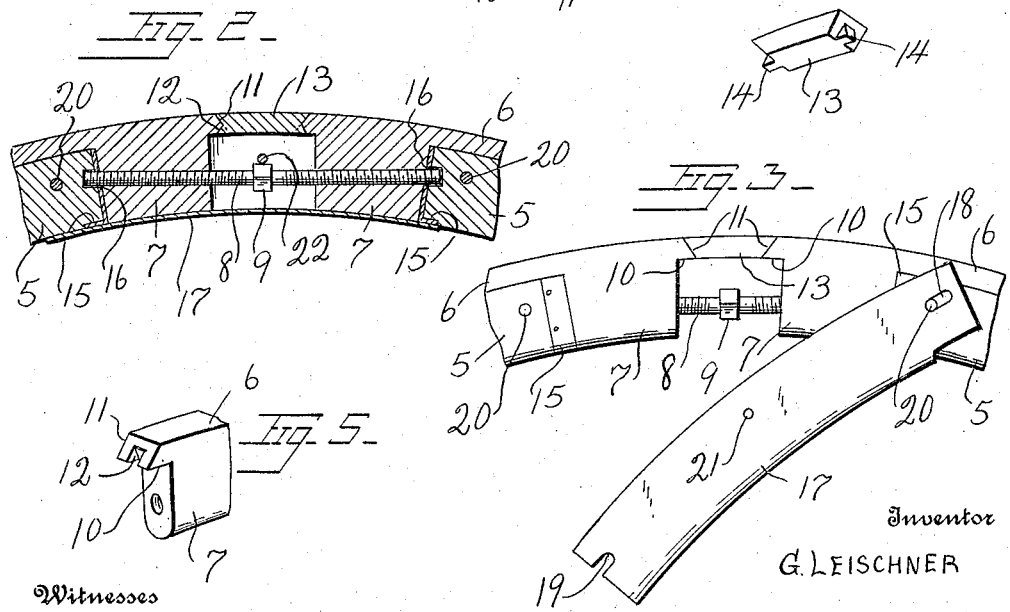
Inventor
G. LEISCHNER

UNITED STATES PATENT OFFICE.

GOTTHILF LEISCHNER, OF MEGARGEL, TEXAS.

TIRE-TIGHTENER.

1,162,293.  Specification of Letters Patent.  Patented Nov. 30, 1915.

Application filed November 28, 1914. Serial No. 874,472.

*To all whom it may concern:*

Be it known that I, GOTTHILF LEISCHNER, a citizen of the United States, residing at Megargel, in the county of Archer and State of Texas, have invented certain new and useful Improvements in Tire-Tighteners, of which the following is a specification, reference being had to the accompanying drawings.

My invention relates to means for compensating for the relative expansion and contraction of the tires and fellies of vehicle wheels.

The primary object of my invention is the provision of a very simple and easily operated means whereby tires may be contracted upon the felly of a vehicle wheel or expanded with relation thereto.

A further object of the invention is to provide a split tire with means connecting the ends of the tire whereby the tire may be contracted to any desired extent, and in this connection to provide a filling piece adapted to be disposed between the confronting ends of the tire and locked firmly in position against movement in any direction when the tire is contracted upon the felly.

A further object of the invention is to provide the confronting ends of the felly with boxes or ferrules which act to prevent the splitting of the ends of the felly and to also receive and to a certain extent support the extremities of the expanding and contracting screw.

Still another object of the invention is to provide a tire tightener so constructed that all of the parts are entirely housed and protected when in use, the construction being such, however, as will permit ready access to the tightener itself at any time desired without the necessity of removing any part and the consequent liability of its being lost.

Other objects will be more fully brought out in the following specification.

My invention is illustrated in the accompanying drawings, wherein—

Figure 1 is a front elevation of a wheel constructed in accordance with my invention; Fig. 2 is an enlarged longitudinal fragmentary section of the tire and felly of the wheel; Fig. 3 is a fragmentary side elevation of the tire and a portion of the felly with one of the sliding plates opened; Fig. 4 is a fragmentary detail view of the filling piece; Fig. 5 is a fragmentary perspective view of one end of a tire section.

Referring to these drawings, 2 designates a wheel of any suitable character having the usual hub 3 and spokes 4. The felly 5 may be of any suitable form and may be made either in one piece split at one point, or of a plurality of arcuate sections. As illustrated, the felly is shown as made of two sections, but I do not wish to be limited to this construction.

Surrounding the felly is a tire 6. This tire is either made in one section split at one point, or of a plurality of sections and I do not wish to be limited in this matter.

Assuming that the tire is made in two sections and that the felly is also made in two sections, then each section 6 of the tire is provided at its ends with the inwardly directed abutments 7, each of these abutments being longitudinally screw threaded throughout its entire length.

Disposed between each pair of abutments is the adjusting screw 8. This screw is provided at its middle with a many-sided head 9 and is reversely threaded at opposite ends. The adjusting screw 8 has screw-threaded engagement with the abutments 7 and as a consequence when the screw 8 is rotated in one direction, the abutments will be forced apart, and when the screw 8 is rotated in the other direction the abutments will be drawn toward each other. The abutments 7 are preferably made integral with the tire sections 6 and each abutment is disposed slightly inward of the extremity of the adjacent tire section as at 10. The confronting ends of the tire sections are beveled inward and toward each other as at 11, and each beveled face is formed with a medially disposed groove 12 which is inclined reversely to the inclination of the face 11.

Disposed between the confronting ends of the tire sections are the filling pieces 13 which are substantially arcuate in form. The ends of each filling piece are beveled to conform to the beveled faces 11 of the confronting ends of the tire sections, and the extremities of each filling piece are provided with the projecting tongues 14 which are beveled so as to fit within the grooves 12. It will thus be seen that when the filling pieces are in place they are locked from lateral movement and from movement radially either inward or outward.

Riveted, bolted, or otherwise attached to the opposed ends of the felly sections 5 are the ferrules or boxes 15. These form caps upon the ends of the felly sections which prevents the ends of the felly sections from splitting under strain. The transverse web of each cap or ferrule is formed with an opening 16 through which the ends of the adjusting screw 8 project and rest, as will be seen from Fig. 2. The extremities of the screw 8 project about a quarter of an inch into the confronting ends of the felly sections.

For the purpose of inclosing and housing the tire adjusting mechanism, and also for the purpose of locking the screw 8 in its adjusted position, I provide the side plates 17. These plates are arcuate in form and are disposed one on each side of the felly at the gap between the felly sections. Each plate 17 at one end is formed with a slot 18 and at its opposite end with a slit 19 opening above the extremity of the plate 17.

The felly sections are provided adjacent their confronting ends with the headed pins 20. One of these pins passes through the slot 18, while the other pin on the opposite felly section is engaged by the slit 19 when the plates are arranged in alinement with the felly. The pins 20 are preferably formed by bolts which pass through the felly sections and are provided upon their extremities with nuts. This eliminates the necessity of removing the bolts 20 in order to shift the plates 17 out of the way. It is only necessary to loosen the bolts 20 so as to permit the plates 17 to be shifted in one direction and then allow them to drop down into the position shown in Fig. 3. Thus ready access may be had to the adjusting screw 8 so as to permit the application of a wrench to the head 9 whereby the screw may be turned.

In order to prevent the accidental rotation of the screw 8 I provide means whereby this screw is locked from rotation and to this end I provide the side plates 17 each with a bolt-hole 21 through which a bolt 22 passes, this bolt being so disposed as to engage with one of the facets of the head 9. It is obvious, therefore, that when the side plates 17 are in their closed position and the bolt 22 passes through the perforations 21, it will lock the screw 8 from rotation.

It is to be understood that the filler pieces 13 are to be made of various sizes, so that as the wheel shrinks, requiring the tightening up of the tire, shorter filler pieces may be inserted.

The advantages of my invention are due more particularly to the fact that the tire is tightened upon the felly rather than the felly expanded against the tire. Expanding of the felly against the tire tends to shift the felly outward upon the ends of the spokes, whereas by tightening the tire as the felly shrinks, the felly may be far more firmly forced down upon the spokes. It will furthermore be seen that the screw 8 is not subjected to shocks as it would be were this screw abutted against the felly sections, and did this screw sustain the strain of holding the felly sections apart or expanded against the tire. The compressive strain exerted upon the wheel is received by the filling piece 13, and thus there is no danger of the screw 8 being bent or otherwise damaged.

While I have illustrated what I believe to be the best form of my invention, I do not wish to be limited to the details of construction, as it is obvious that many changes might be made without departing from the spirit of the invention.

Having described my invention, what I claim is:

The combination with a split felly, of extensions formed on the opposed ends of the sections, the opposed faces of the extensions being beveled toward each other, said opposed faces being provided with recesses having their end walls beveled in a direction opposite to the beveled faces of the extensions, a filling piece disposed between the extensions having its opposite ends beveled to correspond to the beveled faces of the extensions, beveled tongues formed upon the ends of the filling piece having engagement within the recesses on the extensions.

In testimony whereof I hereunto affix my signature in the presence of two witnesses.

GOTTHILF LEISCHNER.

Witnesses:
W. O. WRIGHT,
EVA CLARK.

Copies of this patent may be obtained for five cents each, by addressing the "Commissioner of Patents, Washington, D. C."